United States Patent [19]
Beuter

[11] Patent Number: 5,455,411
[45] Date of Patent: Oct. 3, 1995

[54] AUTOFOCUS DEVICE FOR STILL PROJECTION APPARATUS

[75] Inventor: Bernd Beuter, Stuttgart, Germany

[73] Assignee: Eastman Kodak Company, Rochester, N.Y.

[21] Appl. No.: 244,970

[22] PCT Filed: Oct. 16, 1993

[86] PCT No.: PCT/EP93/02856

§ 371 Date: Jun. 17, 1994

§ 102(e) Date: Jun. 17, 1994

[87] PCT Pub. No.: WO94/09405

PCT Pub. Date: Apr. 28, 1994

[30] Foreign Application Priority Data

Oct. 21, 1992 [DE] Germany ............... 42 35 392.0

[51] Int. Cl.[6] .................................................. G03B 21/53
[52] U.S. Cl. .................................... 250/201.6; 353/101
[58] Field of Search ......................... 250/201.6, 201.7, 250/201.4, 201.2, 204, 205; 353/101, 71; 356/1; 348/745

[56] References Cited

U.S. PATENT DOCUMENTS

| | | | |
|---|---|---|---|
| 4,198,138 | 4/1980 | Parker et al. ............... | 353/101 |
| 4,220,850 | 9/1980 | McEachern ............... | 250/204 |
| 4,494,839 | 1/1985 | Brueckner ............... | 353/101 |
| 4,743,109 | 5/1988 | Harvey ............... | 353/101 |
| 4,748,469 | 5/1988 | Tamura ............... | 250/201.4 |
| 5,379,082 | 1/1995 | Staiger ............... | 353/101 |

FOREIGN PATENT DOCUMENTS

| | | | |
|---|---|---|---|
| 0131794 | 6/1988 | European Pat. Off. ......... | G03B 3/10 |
| 1263129 | 2/1972 | United Kingdom ............. | G03B 3/02 |

*Primary Examiner*—Edward P. Westin
*Assistant Examiner*—John R. Lee
*Attorney, Agent, or Firm*—Francis H. Boos, Jr.

[57] ABSTRACT

An autofocus device for still projection apparatus employing a light source and dual photoreceiver. A signal generator applies variable current pulses to the light source. A signal processing circuit converts output signals from the dual photoreceiver into digital signals from which direction and speed control signals are derived and applied to focus control means. Alternative signal processing circuits are disclosed for driving either an analog on digital stepper focus drive motor.

15 Claims, 4 Drawing Sheets

AUTOFOCUS DEVICE FOR STILL PROJECTION APPARATUS

FIELD OF THE INVENTION

The invention relates to an autofocus device for still projectors, comprising a controlled measuring radiation source emitting a beam of radiation which is directed onto the surface of a slide to be focussed and is reflected therefrom to a dual photoreceiver mechanically coupled to a focussing device, the signals of said photoreceiver activating an electronic control means such that a servomotor connected thereto influences the focussing device until the measuring radiation reflected by the slide impinges on the central portion of the dual photoreceiver.

BACKGROUND OF THE INVENTION

Autofocus devices for still projectors using controllable measuring radiation sources are known.

EP-PS 0131 794 discloses an autofocus device for still projectors in which an infrared light emitting diode is used as a measuring radiation source which is operated by means of the half-wave voltage of a power rectifier and whose emission is controlled in response to the signal obtained from a dual photoreceiver. The device also includes a differential amplifier which amplifies and rectifies only the alternating portion of the signals received from the dual photoreceiver. An additional amplifier amplifies the rectified signal to activate a d.c. motor of a focussing drive.

It is the object of the present invention to provide an autofocus device of the generic type which effects fast and reliable focussing of a slide and which, in particular, is insensitive to interference signals and component tolerances and has a short reaction time and high positioning accuracy. Moreover, it should be guaranteed that slides which have different reflection factors are also quickly and reliably focussed.

SUMMARY OF THE INVENTION

The above object is attained by a generator circuit for controlling the measuring radiation source by means of variable current pulses and a signal processing circuit for digital signals.

In a preferred embodiment of the invention, the generator circuit is provided with a controllable ramp generator to produce sawtooth current pulses, and with a control circuit to control their leading edge slopes in response to the signals obtained from the dual photoreceiver. Furthermore, the signal processing circuit is provided with a threshold circuit to produce digital input signals from the signals obtained from the dual photoreceiver, and with a signal decoding circuit for separating digital direction signals and digital speed signals from the input signal.

Expediently, the autofocus device is designed such that the ramp generator is provided with a clock control circuit to control the current pulses in their time-related sequences and duration, and with a limiting circuit to control amplitude and duration of the current pulses. Moreover, the signal processing circuit is provided with a signal conversion circuit for the speed signal to produce a motor control voltage for the servomotor, and with a signal control circuit to centrally control the circuits of the measuring radiation source and the servomotor. The measuring radiation source is designed as a diode emitting I.R. radiation.

Advantageously, the embodiment according to the invention includes an interface circuit within the signal processing circuit by means of which the circuits of the measuring radiation source and the servomotor are controlled by digital control signals of a microprocessor unit and/or a remote control unit.

Further features and advantages will be apparent from the description of an embodiment of the invention shown in the drawing as well as from the subclaims.

BRIEF DESCRIPTION OF THE PREFERRED EMBODIMENTS

Figure 1:
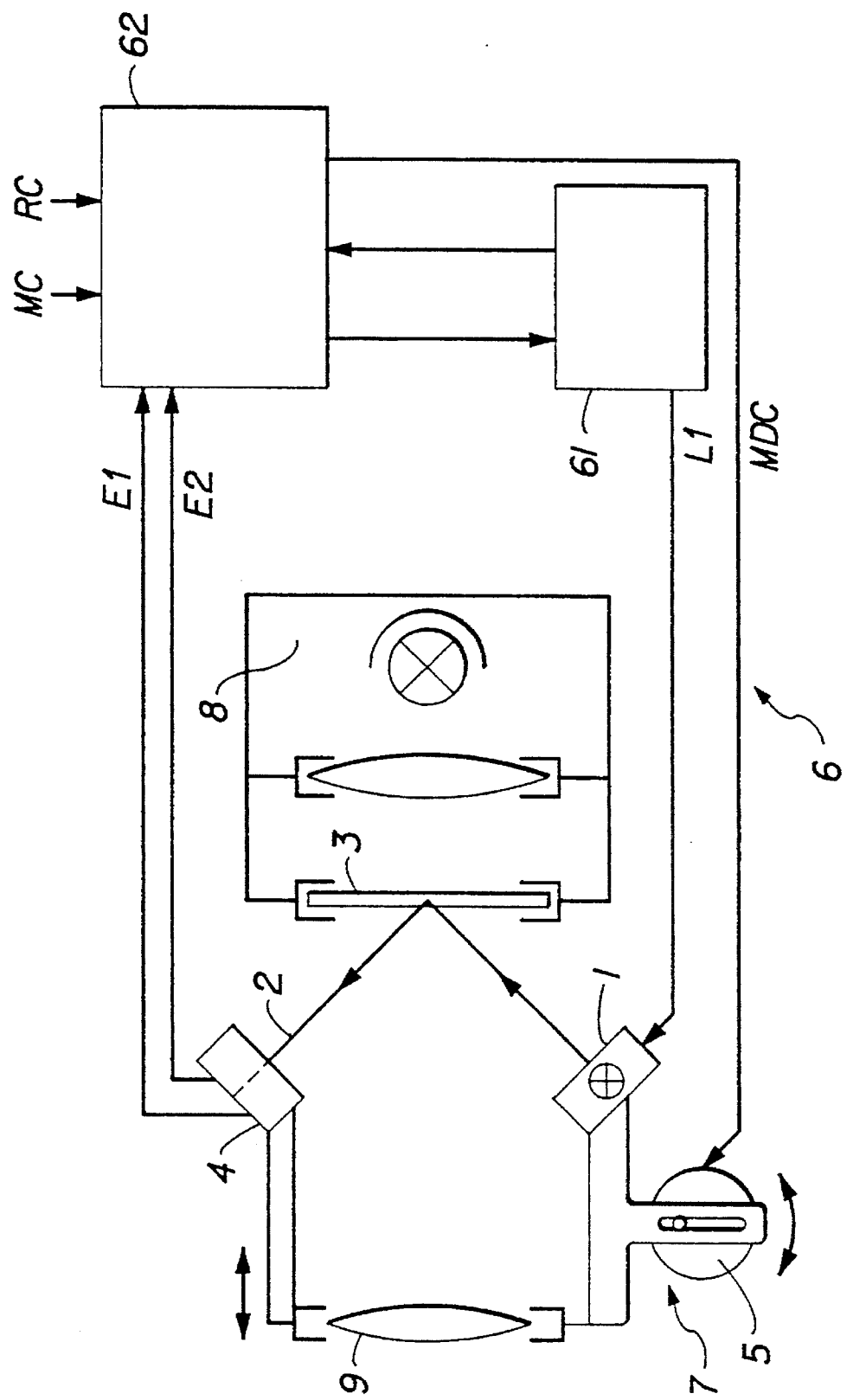
FIG. 1 shows the autofocus device according to the invention in a schematic overall representation.

The autofocus device shown in FIG. 1 includes a measuring radiation source 1 having a measuring beam 2 which is directed at a slide 3 to be focussed and is reflected therefrom onto a dual photoreceiver 4. The measuring radiation source 1 and the photoreceiver 4 are stationarily connected to the holder of a projection lens 9 which is slideable along its optical axis by means of a servomotor 5 via an eccentric of a focussing drive 7. If the slide-to-projection lens distance corresponds to a nominal value, i.e. when the slide is in focus, the reflected beam 2 impinges exactly onto the central portion of the dual photoreceiver 4 so that both systems of the photoreceiver receive equal amounts of illumination and, as a result, produce identical signals. If the slide-to-lens distance deviates from the nominal value, one of the photoreceiver systems is illuminated more intensely than the other and, thus, different signals are produced.

The dual photoreceiver 4 is followed by a signal processing circuit 62 of a control means 6 for processing the signals E1, E2 received from the photoreceiver and for activating the servomotor 5. To supply power and to control the measuring radiation source 1, it is connected to a generator circuit 61 of control means 6.

An illumination means 8 is provided to project the image of slide 3 onto a screen, said means 8 consisting of a lamp which includes a concave mirror and a condensor system.

Figure 2:
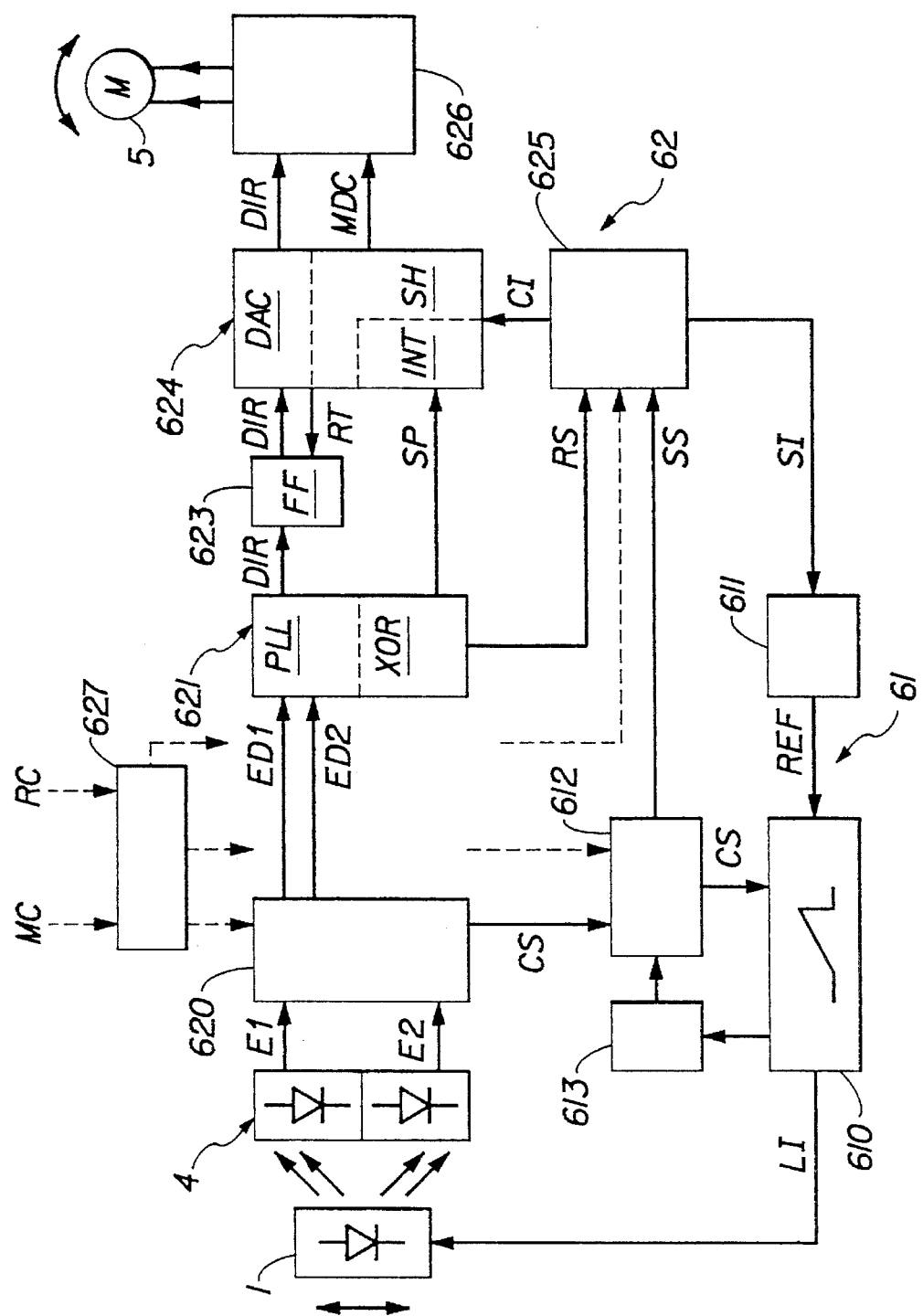
FIG. 2 shows the autofocus device of FIG. 1 in a block diagram.

As shown in FIG. 2, the generator circuit 61 consists of a ramp generator 610 designed as an integrator circuit to produce sawtooth current pulses, a control circuit 611 to control the leading edge slopes of the current pulses, a clock control circuit 612 to control the current pulses in their time-related sequence and duration, and a limiting circuit 613 to control amplitude and duration of the current pulses. The signal processing circuit 62 comprises a threshold circuit 620 to produce digital input signals ED1, ED2 from the signals E1, E2 received by the photoreceiver 4, a signal decoding circuit 621 to separate both a digital direction signal DIR and a digital speed signal SP from the input signals ED1, ED2, a memory circuit 623 for the direction signal DIR, a signal converting circuit 624 followed by a motor control circuit 626 to produce a motor control signal MDC, MST for the servomotor 5, a signal control circuit 625 to centrally control the circuits of the measuring radiation source and the servomotor, and an interface circuit 627 to control the circuits by means of digital control signals MC, RC of a microprocessor unit and/or remote control unit (not illustrated).

The signal decoding circuit 621 includes a phase comparator circuit PLL to produce a single-bit direction signal DIR and an EXclusive/OR circuit XOR to produce a speed signal SP by means of a pulse width modulation.

The signal converting circuit 624 consists of a digital-to-analog converter DAC having a signal integrator INT and a signal holding circuit SH to produce an analog motor control voltage MDC for the servomotor 5. The motor control circuit 626 following is designed as a bridge amplifier circuit to control direction (sense of rotation) and speed of the servomotor 5 which is designed as a d.c. motor.

An infrared light emitting diode is provided as a measuring radiation source 1 having a beam 2 with a wavelength in the IR range the photoreceiver 4 is sensitive to.

Figure 3:
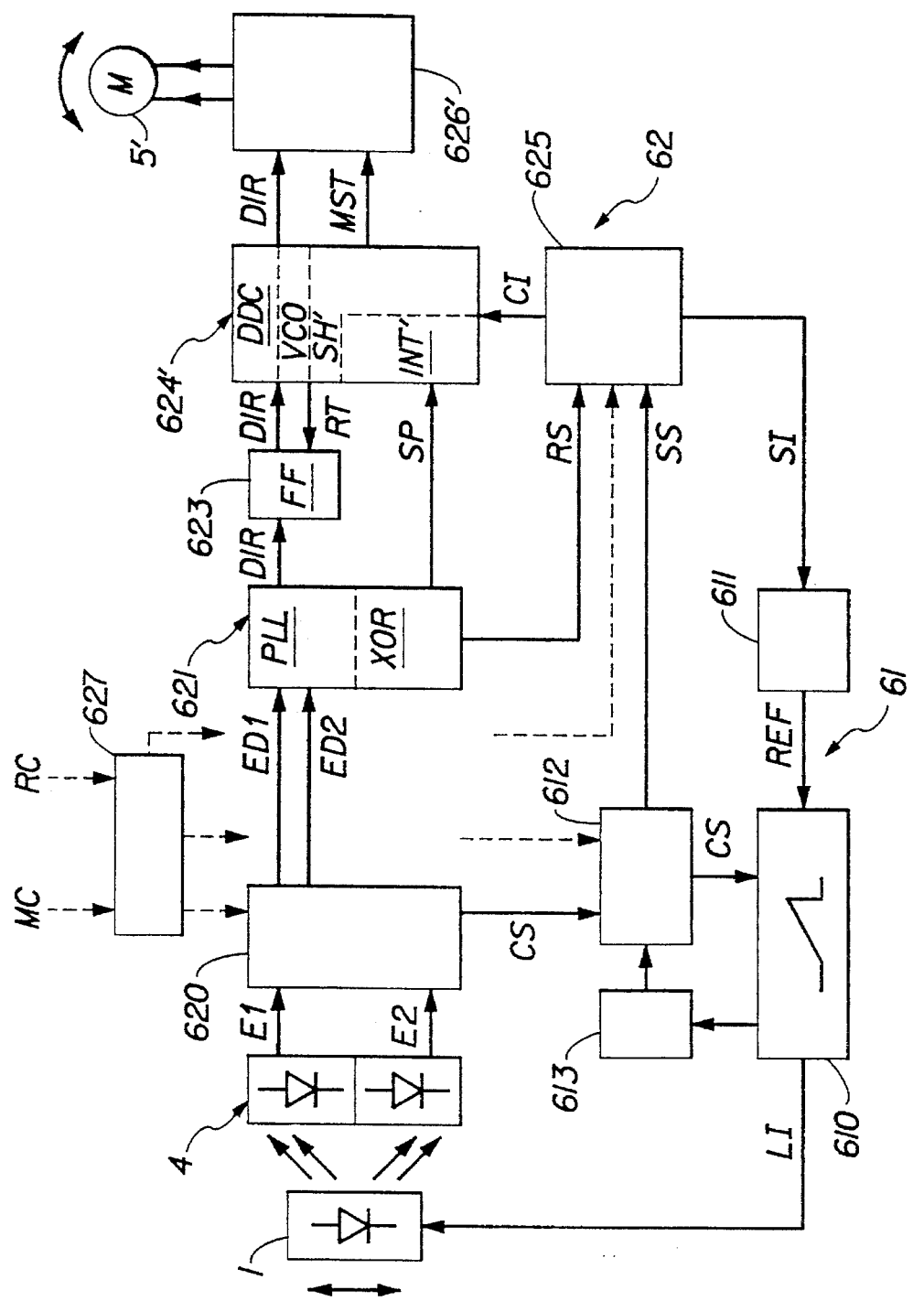
FIG. 3 is another embodiment of the autofocus device of FIG. 2.

Contrary to FIG. 2, FIG. 3 shows the signal converting circuit 624' which is not designed as a digital-to-analog converter but has a digital-to-digital converter DDC having a signal integrator INT', a signal holding circuit SH' and a voltage-to-frequency converter VCO to produce digital control pulses MST for the servomotor 5'. The control circuit 626' following is designed as a control amplifier circuit to control direction and speed of the servomotor 5' designed as a stepper motor.

The circuits shown in FIGS. 1 to 3 consist of commercially available components and, as a result, are neither illustrated nor described in detail.

According to a functional diagram shown in FIG. 4, the autofocus device operates as follows:

First, a slide 3 is inserted in a slide gate of the autofocus device according to FIGS. 1 and 2 by means of a slide changing means (not illustrated). The slide 3 should take a de-focussed position such that beam 2 of the measuring radiation source 1 illuminates the first system of the dual photoreceiver 4 more intensely than the second. At the same time, the ramp generator 610 of the generator circuit 61 in the measuring radiation source 1 produces a current flow of continuous, sawtooth current pulses LI, the intensity of the measuring radiation source following approximately the current pulse sequence.

Figure 4:
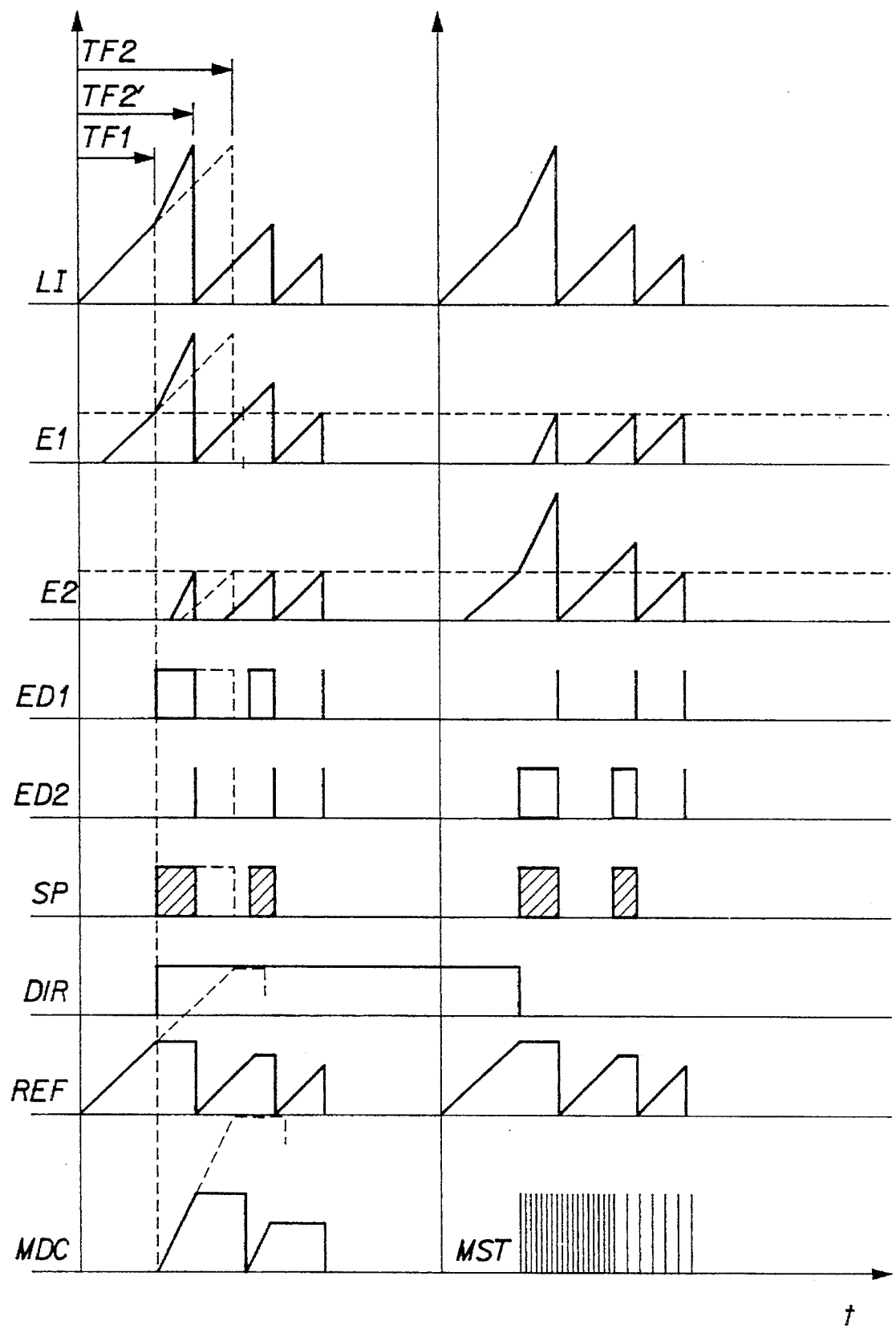
FIG. 4 is a functional diagram of the autofocus device of FIG. 1.

According to FIG. 4, initially in the first system of the photoreceiver a signal E1 is produced during the leading edge slope of a first current pulse LI and then a signal E2 in the second system.

The E1, E2 signal sequence approximately corresponds to the intensity of the current pulse sequence.

As shown in FIG. 2, signals E1 and E2 are then fed to a threshold circuit 620 to be converted to standardized digital input signals ED1, ED2. The reaching of the threshold by the signals E1 and E2 determines the instants to be considered for recording the degree of de-focussing, which means that the sequence of the input signals ED1, ED2 represents the direction of de-focussing, and the time-related distance of the individual signals from each other the degree of de-focussing. Subsequently, in the signal decoding circuit 621 a high-level single-bit direction signal DIR is produced by means of the phase comparator circuit PLL (e.g. PLL circuit), and a speed signal SP by means of the EXclusive/OR circuit XOR, the signal duration of the speed signal corresponding to the time-related distance between the input signals ED1 and ED2.

The direction signal DIR is stored in the memory circuit 623 (e.g. a flip-flop FF) until the focus position is reached. A second EXclusive/OR circuit (not illustrated) suppresses interference signals of the first EXOR-circuit during its low level phase at the output SP.

Then, the direction signal DIR and the speed signal SP are fed to the signal converting circuit 624 by means of which, on the one hand, the direction signal DIR stored in the memory circuit 623 is erased via a control signal RT when the focus position is reached, and on the other, the pulse-width-modulated speed signal SP is integrated by means of the signal integrator INT in response to its duration and temporarily stored in the signal holding circuit SH until a following sawtooth-shaped current pulse LI of the ramp generator 610 starts or until a following input signal ED1 occurs, and then discharged and reset, respectively. The signal converting circuit 624 is activated by means of a control signal SS of the clock control circuit 612 and including the signal control circuit 625 and its control signal CI, and de-activated by means of a control signal RS of the signal decoding circuit 621 and including the signal control circuit. Thus, the speed signal SP is converted into an analog motor control voltage MDC having an amplitude which depends on the degree of defocussing of slide 3.

Subsequently, in the motor control circuit 626 the motor control signal MDC is amplified and by means of the direction signal DIR converted into a polarity required for obtaining focus, i.e. for determining the sense of rotation of the servomotor 5. Then the servomotor starts moving the focussing drive 7 towards the focus position, the amplitude of the motor control voltage MDC determining the motor speed.

When the ramp generator 610 emits its next sawtooth current pulse LI shown in FIG. 4, the focussing drive 7 has already moved slightly towards the focus position so that the time-related distance of the input signals ED1 and ED2 from each other and the speed signal SP emitted by the signal decoding circuit 621 are shorter and, thus, the motor control voltage MDC outputs a smaller amplitude.

As the focussing drive 7 reaches the focus position, the time-related distance of the input signals ED1 and ED2 becomes zero and, as a result, the servomotor is stopped.

If slide 3 is de-focussed in a direction opposite to that described, a signal E2 or an input signal ED2 is produced first by the second system of the dual photoreceiver 4 when a first current pulse LI is emitted by the ramp generator 610. When subsequently an input signal ED1 occurs, a low-level directional signal DIR is emitted by the signal decoding circuit 621 and the de-focussing drive 7 is moved towards the focus position from the opposite direction.

If instead of the d.c. motor shown in FIG. 2 a stepper motor according to FIG. 3 is used as a servomotor 5, a motor control signal MST produced by the signal converting circuit 624' is emitted as a sequence of digital control pulses whose frequency is proportionate to the degree of de-focussing of slide 3.

According to FIGS. 2 and 4, the leading edge slope control of the current pulses LI operates as follows:

Initially, the ramp generator 610—upon release by a control signal MC of the microprocessor unit—produces the first current pulse LI (having a predetermined constant leading edge slope) up to an instant TF1 when the first signal E1 received by the twin type photoreceiver 4 has reached the threshold of the threshold circuit 620. At the same time, a reference voltage REF is produced in the control circuit by means of an integrator circuit, the REF voltage level being determined by the time period required to reach instant TF1.

As from instant TF1, the further leading edge slope—in response to the reference voltage REF—is equal or greater, the reference signal being connected to the ramp generator 610 via the clock control circuit 612 by means of a control signal CS produced by the threshold circuit 620, and integration of the reference signal in the control circuit 611 being stopped by means of a control signal SS of the clock control circuit 612 and a control signal SI of the signal control circuit 625. The reference signal REF is temporarily stored in the control circuit 611 until signal E2 from the second system of the photoreceiver has reached the threshold at an instant TF2, and subsequently the reference signal is reset to its initial value by a control signal RS of the signal decoding circuit 621. Then a new cycle starts in which the ramp generator 610 produces the next current pulse LI.

In FIG. 4, in a first sequence the leading edge slopes of current pulses LI are shown for a slide 3 having a low reflection factor, from which results a long period until the first instant TF1 is reached by the signal E1.

This effects, as from instant TF1, a steeper leading edge slope of the first current pulse LI and a greater increase of the intensity of the measuring beam 2 so that the signal E2 from the second system of the photoreceiver reaches the threshold of the threshold circuit 620 at an earlier instant TF2'. A speed signal SP resulting therefrom and a motor control voltage MDC are reduced to the extent that the influence of the reflection factor of the slide is compensated for and the speed of the servomotor depends only on the degree of de-focussing of slide 3.

To compensate for component tolerances, e.g. those of the measuring radiation source 1, the control means 6 operates in the same manner.

What is claimed is:

1. Autofocus device for still projectors, comprising a controlled measuring radiation source (1) emitting a light beam (2) which is directed onto the surface of a slide (3) to be focussed and is reflected therefrom to a dual photoreceiver (4) mechanically coupled to a focussing drive (7), the signals of said photoreceiver (4) activating an electronic control means (6) such that a servomotor (5) connected thereto influences the focussing drive (7) until the measuring radiation reflected by the slide (3) impinges on the central portion of the dual photoreceiver, characterized by a generator circuit (61) for controlling the measuring radiation source (1) by means of variable current pulses (LI) and a signal processing circuit (62) for converting signals from the photoreceiver into digital signals and utilizing said digital signals to produce control signals applied to said control means.

2. Autofocus device according to claim 1, characterized in that the generator circuit (61) is provided with a controllable ramp generator (610) to produce sawtooth current pulses (LI).

3. Autofocus device according to claims 1 or 2, characterized in that the generator circuit (61) is provided with a control circuit (611) by means of which the leading edge slopes of the current pulses (LI) are controlled in response to the signals (E1, E2) obtained from the dual photoreceiver (4).

4. Autofocus device according to claim 2, characterized in that the ramp generator (610) is provided with a clock control circuit (612) by means of which the current pulses (LI) are controlled in their time-related sequences and duration.

5. Autofocus device according to claim 2, characterized in that the ramp generator (610) is provided with a limiting circuit (613) by means of which the amplitudes and the duration of the current pulses (LI) are controlled.

6. Autofocus device according to claim 1, characterized in that the signal processing circuit (62) is provided with a threshold circuit (620) to produce digital input signals (ED1, ED2) from the signals (E1, E2) obtained from the dual photoreceiver (4).

7. Autofocus device according to claims 1 or 6, characterized in that a signal decoding circuit (621) is provided by means of which a digital direction signal (DIR) and a digital speed signal (SP) are separated from first and second input signals (ED1, ED2) from the dual photoreceiver.

8. Autofocus device according to claim 7, characterized in that a memory circuit (623) is provided for storing the direction signal (DIR).

9. Autofocus device according to claim 7, characterized in that a signal conversion circuit (624, 624') for the speed signal (SP) is provided by means of which a motor control voltage (MDC, MST) for the servomotor (5) is produced.

10. Autofocus device according to claim 1 characterized in that in the signal processing circuit (62) a signal control circuit (625) is provided by means of which the circuits of the measuring radiation source (1) and the servomotor (5) are centrally controlled.

11. Autofocus device according to claim 1 characterized in that in the signal processing circuit (62) an interface circuit (627) is provided by means of which the circuits of the measuring radiation source (1) and the servomotor (5) are controlled by digital control signals (MC, RC) of a microprocessor unit and/or a remote control unit.

12. Autofocus device according to claim 7, characterized in that the signal decoding circuit (621) includes a phase comparator circuit (PLL) for the direction signal (DIR).

13. Autofocus device according to claim 1, characterized in that the measuring radiation source (1) is designed as a diode emitting I.R. radiation.

14. Autofocus device according to claim 9, characterized in that the signal converting circuit (624) is designed as a digital-to-analog converter to produce a motor control voltage (MDC) for the servomotor (5) designed as a d.c. motor.

15. Autofocus device according to claim 9, characterized in that the signal converting circuit (624') is designed as a digital-to-digital converter to produce motor control pulses (MST) for the servomotor (5) designed as a stepper motor.

* * * * *